(12) United States Patent
Roche

(10) Patent No.: US 7,965,161 B2
(45) Date of Patent: Jun. 21, 2011

(54) DEVICE FOR MOVING A BODY LINEARLY BETWEEN TWO PREDETERMINED POSITIONS

(75) Inventor: Sylvain Roche, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 11/613,712

(22) Filed: Dec. 20, 2006

(65) Prior Publication Data

US 2007/0176496 A1 Aug. 2, 2007

(51) Int. Cl.
*H01F 7/00* (2006.01)
*H01H 67/02* (2006.01)
*H01H 9/00* (2006.01)

(52) U.S. Cl. .......................... 335/229; 335/136; 335/179

(58) Field of Classification Search .......... 335/177–179, 335/229, 136
See application file for complete search history.

(56) References Cited

U.S. PATENT DOCUMENTS

| | | | | | |
|---|---|---|---|---|---|
| 3,070,730 | A | * | 12/1962 | Gray et al. | 335/229 |
| 4,306,207 | A | * | 12/1981 | Tada et al. | 335/234 |
| 4,604,599 | A | * | 8/1986 | Koehler | 335/230 |
| 4,617,546 | A | * | 10/1986 | Kellogg et al. | 335/170 |
| 4,704,591 | A | * | 11/1987 | Hafner | 335/229 |
| 4,774,485 | A | * | 9/1988 | Dietrich | 335/230 |
| 5,032,812 | A | * | 7/1991 | Banick et al. | 335/17 |
| 5,034,714 | A | | 7/1991 | Bratkowski et al. | |
| 5,166,652 | A | * | 11/1992 | Koyama et al. | 335/234 |
| 5,268,662 | A | * | 12/1993 | Uetsuhara et al. | 335/229 |
| 5,303,012 | A | * | 4/1994 | Horlacher et al. | 335/253 |
| 5,422,617 | A | * | 6/1995 | Brown | 335/267 |
| 5,434,549 | A | * | 7/1995 | Hirabayashi et al. | 335/229 |
| 5,523,684 | A | * | 6/1996 | Zimmermann | 324/207.22 |
| 5,543,766 | A | * | 8/1996 | Bagalini | 335/177 |
| 6,175,292 | B1 | * | 1/2001 | Gruden | 335/267 |
| 6,414,577 | B1 | * | 7/2002 | Hoffman | 335/229 |

(Continued)

FOREIGN PATENT DOCUMENTS

JP 03003654 1/1991

(Continued)

OTHER PUBLICATIONS

Search Report for French patent application No. 0513168, dated Aug. 25, 2006, 2 pages.

*Primary Examiner* — Anh T Mai
*Assistant Examiner* — Alexander Talpalatskiy
(74) *Attorney, Agent, or Firm* — McDonnell Boehnen Hulbert & Berghoff LLP

(57) ABSTRACT

A device (1) suitable for moving a body (2) along a linear path (F) between two predetermined positions, and comprising: first and second electromagnets (5, 8) respectively having first and second moving cores (6, 9) that are secured to the body and that are arranged to have axes of action (7, 10) on the body that are parallel to the path (F), and a permanent magnet (11) associated functionally with the first core (6) and disposed to co-operate magnetically and functionally therewith when the body finds itself in its first position, and preferably return means (13) that are associated with the body so as to urge it back from the second position to the first position when the second electromagnet (8) is not excited.

7 Claims, 3 Drawing Sheets

U.S. PATENT DOCUMENTS

| | | | |
|---|---|---|---|
| 6,496,092 B1 * | 12/2002 | Schnatterer et al. | 335/220 |
| 6,677,844 B1 * | 1/2004 | Gorospe et al. | 335/220 |
| 6,791,442 B1 * | 9/2004 | Schmidt | 335/220 |
| 6,946,937 B2 * | 9/2005 | Donce | 335/282 |
| 7,280,019 B2 * | 10/2007 | Kolb et al. | 335/229 |
| 2003/0155820 A1 | 8/2003 | Tominaga et al. | |
| 2005/0024174 A1 * | 2/2005 | Kolb et al. | 335/220 |
| 2005/0199198 A1 * | 9/2005 | Morin et al. | 123/90.11 |
| 2007/0257756 A1 * | 11/2007 | Matsumoto et al. | 335/229 |

FOREIGN PATENT DOCUMENTS

| | | |
|---|---|---|
| JP | 06303737 | 10/1994 |
| JP | 08187646 | 7/1996 |
| JP | 2004140974 | 5/2004 |

* cited by examiner

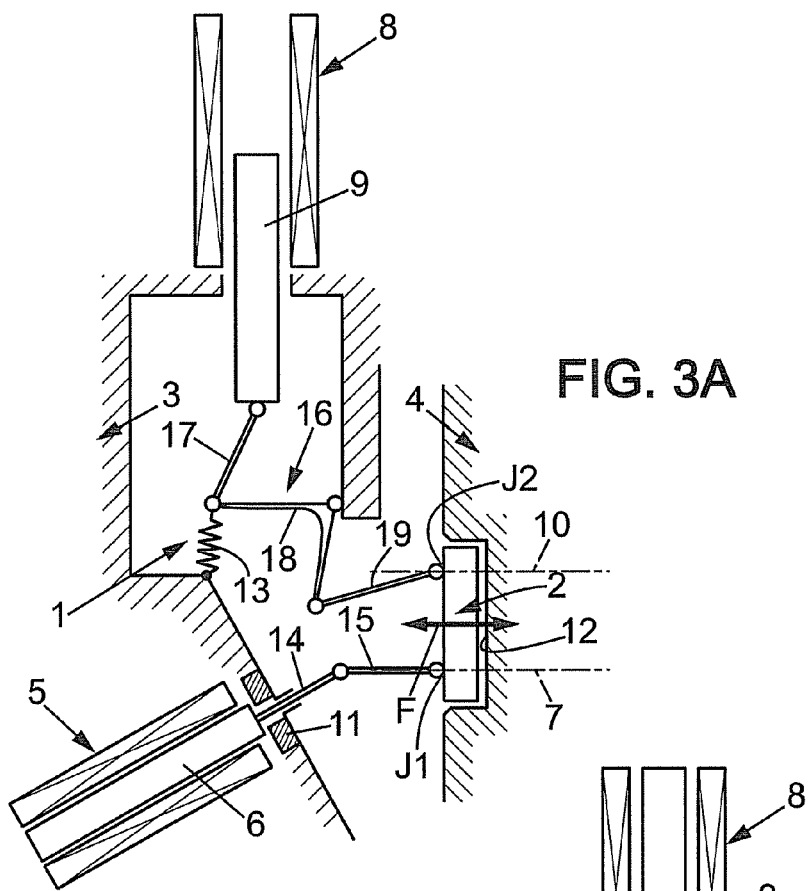
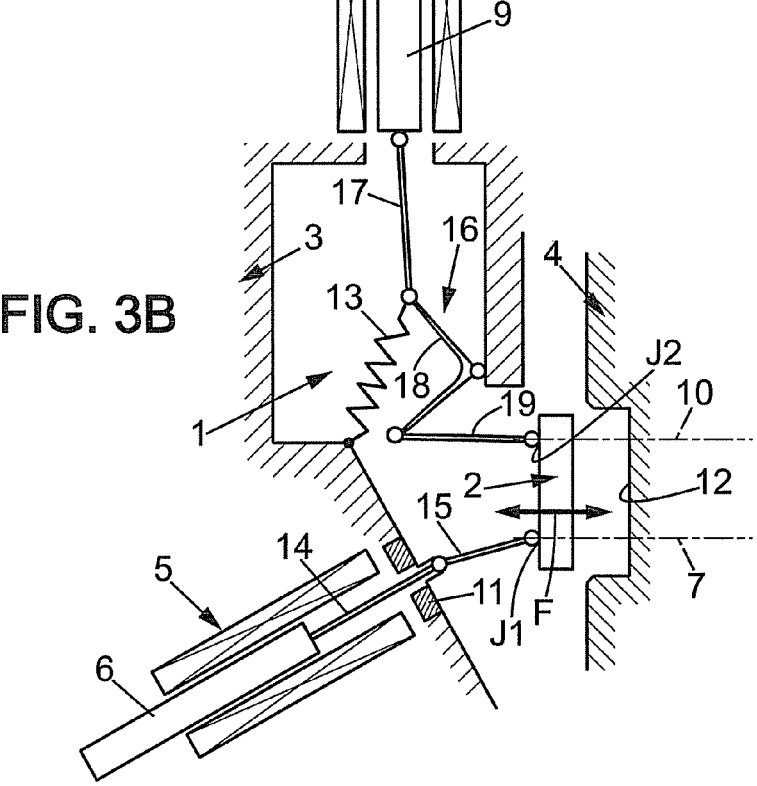

DEVICE FOR MOVING A BODY LINEARLY BETWEEN TWO PREDETERMINED POSITIONS

FIELD OF THE INVENTION

The present invention relates to the field of moving a body in translation, i.e. along a substantially linear path, between first and second predetermined positions.

In particular, the invention relates to moving a body in translation between a stable first position (in particular a rest position) and a second position that requires a constant but minimum supply of power in order to be held. Preferably the stable first position should be a failsafe position, i.e. it should be taken up by the body in the event of a failure in the supply of power required to maintain the second position. Finally, the body can be subjected to load factors and should be capable of being held in the first and the second positions in the presence of such load factors.

BACKGROUND OF THE INVENTION

One technical solution to address the problem posed could consist in implementing an electromagnet that is functionally associated with a return spring for returning the body to the stable first position. Exciting the electromagnet makes it possible to overcome the opposing force due to the spring and thus to move the body in translation towards the second position. The pre-stressing of the spring makes it possible to hold the body in the first position in the presence of loads smaller than said pre-stressing. As regards failing safely, the return spring spontaneously returns the body to the first position in the event that the power supply to the electromagnet is interrupted.

Unfortunately, that conventional solution lies in the fact that holding the body in the second position, which requires a constant supply of power corresponding to at least the power supply necessary for the electromagnet to overcome the force generated by the return spring as compressed, which does not satisfy the desire for the power supply to be minimized.

Another solution could consist in implementing a motor and gearbox unit associated with a screw-and-nut or geared transmission device in order to move the body in translation; the presence of a clutch device can procure the desired failsafe effect.

Unfortunately that other solution suffers from drawbacks. Motor and gearbox units suitable for transforming the movement in rotation of the motor into a movement in translation under a sufficient traction force do not make it possible to guarantee a travel time between the first and second positions that is as short as the travel time procured by an electromagnet. In addition, implementing a screw-and-nut transmission very significantly reduces the efficiency of the device. Furthermore, such a transmission is generally irreversible: in order to satisfy the failsafe constraint, it is then necessary to use a declutch device for declutching the screw or the nut in order to allow the body to return freely to the first position.

Under such conditions, if additional requirements are added, such as looking for a short stroke that is traveled in as short a time as possible, or looking for a device that occupies a rectangular block shaped space that is as small as possible, or indeed looking for power consumption that is as low as possible in order to remain compatible with a low power source that is shared with a plurality of other vital devices in an overall system, it can be understood that the above-mentioned conventional solutions can in no way satisfy the various and numerous requirements.

In order to give some idea, a particular but non-exclusive application of the invention lies in stabilizing an optronic load, such as a sight mounted on a vehicle in an environment that can be subjected to a large amount of vibration, with the direction of aim being held, and more precisely in stabilizing optronic sensors in which, at rest, the fine pins must be locked by a device that is compact and that does not consume much electrical power. In which case, the body to be moved is a locking member (finger, stud, or the like) belonging to a support or to the load to be locked, and suitable for being engaged in a recess belonging respectively to the load or to the support (first stable position that must be occupied in failsafe manner, for locking the load) or for being disengaged (second position, which is a held position, for releasing the load).

BRIEF DESCRIPTION OF THE INVENTION

An essential object of the invention is to satisfy the various requirements of practical use by proposing an improved device which, in particular, is reliable, failsafe, fast, and has low power consumption, and that can be implemented in a compact form.

To these ends, the invention provides a device suitable for moving a body along a substantially linear path between a first predetermined position and a second predetermined position, said device being characterized in that it comprises:
  a first electromagnet which has a first moving core that is secured to said body and that is arranged to have an axis of action on said body that is substantially parallel to said linear path;
  a second electromagnet which has a second moving core that is secured to said body and that is arranged to have an axis of action on said body that is substantially parallel to said linear path; and
  a permanent magnet that is associated functionally with the first core while being disposed in a manner such that it co-operates magnetically and functionally with said first core when the body finds itself in its first position.

By means of this arrangement, the device is suitable for operating as follows:
  when the body is in the first position, the two electromagnets are not excited and the permanent magnet co-operates magnetically with the first core to lock the body in said first position;
  in order to move the body from its first position to its second position, the first electromagnet is excited in polarized manner so as to generate a magnetic field that is equal and opposite to the field generated by the permanent magnet, the first core of the first electromagnet thus being unlocked, and the second electromagnet is then excited, thereby bringing the body into its second position while driving the first core, the first electromagnet being de-excited as soon as the first core is moved away from the permanent magnet;
  the body is held in said second position so long as the second electromagnet is excited; and
  in order to move the body from its second position into said first position, the body is driven from said second position to said first position, while also driving the first core which is brought into magnetic cooperation with the permanent magnet.

A device is thus constituted that satisfies entirely the objects set as regards operating reliability, speed of going from one position to the other, and low power consumption.

As regards going from the second position to the first position, various solutions can be devised, such has, for example exciting, with suitable polarities, the first and/or the second electromagnets. However, a preferred solution consists in that the device further comprises return means, in particular, in simple manner, at least one return spring, associated functionally with the body in a manner such that return means are inoperative when the body finds itself in its first position and are suitable for returning the body to its first position when said body is in its second position. Thus, in order to bring back the body from its second position to its first position, the second electromagnet is de-excited and the body is brought back into its first position by the return means. In addition, the return means are suitable for bringing back the body automatically to its first position in the event of the electrical power supply being interrupted accidentally, so that this arrangement satisfies the failsafe condition that can be required in certain applications.

Advantageously, provision is made for the first and second electromagnets to be arranged to operate in opposition so that the core of one of them is in an "out" position in which it stands proud while the core of the other of them is in the "in" position, and vice versa. It is thus possible to guarantee that one of the electromagnets is in the position in which it can develop maximum force and that the device always operates at maximum speed.

Although it is merely one possible solution, a remarkably simple structural arrangement consists in that the first and second electromagnets are disposed substantially parallel to each other.

In particular for reasons of compactness and for reasons of implementing a preassembled device that is easy to install, it is also possible to imagine that the first and second electromagnets can be disposed on the same side of the body; it is then possible to implement a device in compact manner, e.g. a device that lies within a rectangular volume of dimensions that are predetermined as a function of the space available for installing it. But it is also possible, at least in order to accommodate specific mounting and/or operating conditions, for the two electromagnets to be disposed on either side of the body, in which case it is possible to imagine that their respective cores can be situated substantially in alignment with each other. However, if necessary, other configurations can be adopted and the two electromagnets do not necessarily need to be parallel to each other, e.g. the moving core of at least one of them can be associated with a pivotally mounted bell-crank that makes it possible to transmit the linear movement of the core along another direction.

BRIEF DESCRIPTION OF THE DRAWINGS

The invention can be better understood on reading the following detailed description of certain preferred embodiments given merely by way of illustrative example, and with reference to the accompanying drawings, in which:

FIGS. 3A and 3B are diagrammatic views of another embodiment of a device of the invention, shown in respective ones of two operating positions.

DETAILED DESCRIPTION OF THE INVENTION

Figure 1A:
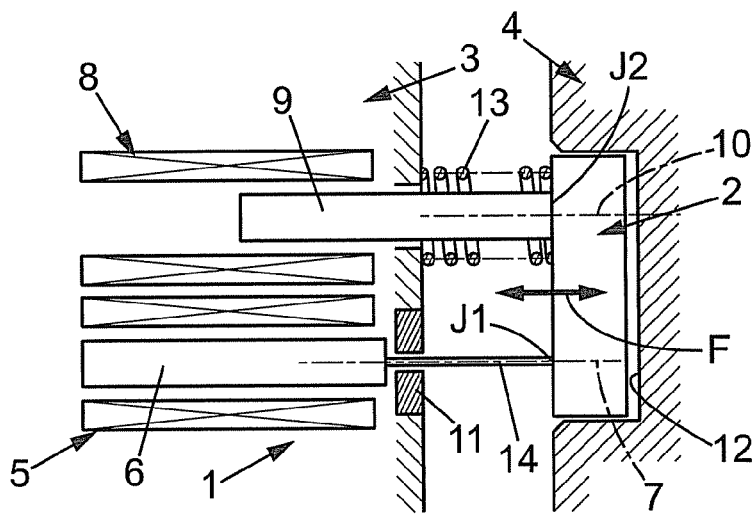
FIGS. 1A and 1B are diagrammatic views of a preferred embodiment of a device of the invention, shown in respective ones of two operating positions.
Figure 1B:
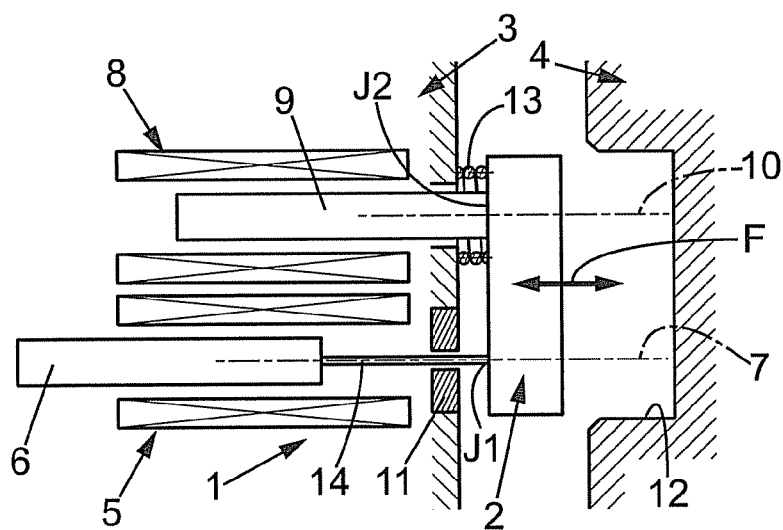

With reference firstly to FIGS. 1A and 1B, those figures show a preferred embodiment of a device designated overall by reference 1, and suitable for moving a body 2 along a substantially linear path (arrow F) between a first predetermined position (FIG. 1A) and a second predetermined position (FIG. 1B). In order to give some idea, but bearing in mind that this is not the sole application of a device of the invention, the body 2 can be a moving latch making it possible to secure two pars 3 and 4 together (FIG. 1A) or to release them from each other (FIG. 1B), one of which parts can be a stationary part while the other is a moving part that needs to be held stationary on command. For example, the first position (FIG. 1A) can need to be a rest position and a failsafe position that must be taken up in the event of an incident, in particular in the event of an interruption in the electrical power supply.

The device 1 comprises:
a first electromagnet 5 which has a first moving core 6 that is secured to said body 2 and that is arranged to have an axis 7 of action on said body 2 that is substantially parallel to said linear path F;
a second electromagnet 8 which has a second moving core 9 that is secured to said body 2 and that is arranged to have an axis 10 of action on said body 2 that is substantially parallel to said linear path F; and
a permanent magnet 11 that is secured to the structure of the device and that is associated functionally with the first core 6 while being disposed in a manner such that it co-operates magnetically and functionally with said first core 6 (i.e. either directly with the first core 6 as shown in the figures, or with an element secured to said first core 6) when the body 1 finds itself in its first position.

In the preferred embodiment shown in FIGS. 1A and 1B, the first and second electromagnets 5 and 8 are disposed substantially parallel to each other, although, as explained below by means of an example, other mounting configurations are possible. In addition, also by way of example, the two electromagnets 5, 8 are disposed on the same side of the body 2. It is thus possible to constitute the device 1 in the form of a subassembly that is compact and of small size, e.g. that is of substantially rectangular shape, and that is easy to house in a small location on the part 3 that supports it.

It should also be noted that the first and second electromagnets 5 and 8 are arranged to operate in mutual opposition so that the core 9 of one of them is in an "out" position in which it stands proud in part from the winding while the core 6 of the other of them is in an "in" position in which it is fully engaged inside the winding (FIG. 1A) and vice versa (FIG. 1B). It is thus possible to guarantee that, in either position, one electromagnet is always capable of developing a maximum force. To this end, one of the cores, e.g. the core 9 of the second electromagnet 8 is secured to the body 2 either directly or via a relatively short connection so that, when the device is in the first position shown in FIG. 1A, the core 9 is "out" in part; in parallel, the other core, which, in this example, is the core 6 of the first electromagnet 5, is secured to the body 2 via a relatively long connection 14 so that, in the first position shown in FIG. 1A, the core 6 is fully engaged inside the electromagnet 5. As shown in FIGS. 1A and 1B, the core 6 is secured to the body 2 at a first junction J1 and the core 9 is secured to the body 2 at a second junction J2.

Under these conditions, the above-described device 1 is suitable for operating as follows:
when the body 2 is in the first position (FIG. 1A), the two electromagnets 5, 8 are not excited and the permanent magnet 11 co-operates magnetically with the first core 6 of the first electromagnet 5 to lock the body 2 in said first position which, in the example shown, is a position in which the two parts 2 an 4 are secured together, the body 2 being engaged in a recess 12 in the facing part 4; the permanent magnet 11 is chosen so that it generates a high static "sticking" force that is capable of absorbing the load factors to which the part 3 and/or the part 4 are subjected, and the field is of short range;

in order to move the body 2 from its first position to its second position, the first electromagnet 5 is excited in polarized manner so as to generate a magnetic field that is equal to the field generated by the permanent magnet 11 and that is opposite in sign thereto; the first core 6 of the first electromagnet 5 is thus unlocked and the force for holding the body in the first position is cancelled to zero; the second electromagnet 8 is then excited, thereby bringing the body 2 into its second position while driving the first core 6 of the first electromagnet 5, the first electromagnet 5 being de-excited as soon as the first core 6 is moved away from the permanent magnet 11;

the body 2 is held in said second position so long as the second electromagnet 8 is excited (FIG. 1B); the two parts 3 and 4 are then free to move relative to each other; and in order to move the body 2 from its second position into said first position, the body 2 is driven from said second position to said first position, while also driving the first core 6 of the electromagnet 5 which is brought into magnetic co-operation with the permanent magnet 11, thereby locking the two parts 3 and 4 together.

The body 2 can be moved from the second position to the first position in various manners. One possible solution could consist in exciting one or both of the electromagnets 5, 8 in polarized manner so that the core 6 and/or 9 drives the body 2 towards the facing part 4 and into the recess 12, so as to guarantee mutual coupling of the two parts 3, 4.

However, another solution that is much more advantageous because it is more reliable as regards failing safely, and that is therefore preferred, consists in providing return means 13 that are associated functionally with the body 2 in a manner such that the return means 13 are inoperative when the body 2 finds itself in its first position (FIG. 1A) and are capable of returning the body 2 to its first position when said body 2 is in its second position (FIG. 1B). under these conditions, in order to bring the body 2 back from its second position to its first position, the second electromagnet 8 is de-excited, and the body 2 is brought back into its first position by the return means 13. In an advantageous embodiment that is shown in FIGS. 1A and 1B, the return means comprise at least one return spring 13, e.g. a compression spring that is positioned between the body 2 and the structure (in particular the casing) of the device 1 or the part 3 supporting said device 1.

The term "functionally associated with the body" is used to mean return means 13 that are interposed between a stationary portion or member of the device (e.g. its casing) or of the part 3 that supports the device 1 and any member of the moving equipment formed by all of the members that are moved at the same time as the body 2, namely, in particular, the body 2 itself, the cores 6 and 9 of the two electromagnets and any connections (such as 14) they have to the body 2. In the arrangement shown in FIGS. 1A and 1B, the return means comprise a helical compression spring 13 mounted coaxially to the core 9 of the second electromagnet 8, between said body 2 and the part 3.

It is emphasized that a fundamental advantage of the arrangement with return means 13 that are structurally and functionally independent from the electromagnets 5, 8 as shown in FIGS. 1A and 1B lies in its ability to fail safely: in the event of an interruption in the electrical power supply for exciting the second electromagnet 8 in the holding position shown in FIG. 1B, the return means 13 automatically bring the body 2 back into the first position (FIG. 1A).

The return spring 13 needs to be pre-loaded in the first position with sufficient force to guarantee that the body 2 returns spontaneously into the first position. The second electromagnet 8 must be dimensioned so that it is capable of moving the body 2 from the first position to the second position by overcoming the force from the return spring 13.

Figure 4:
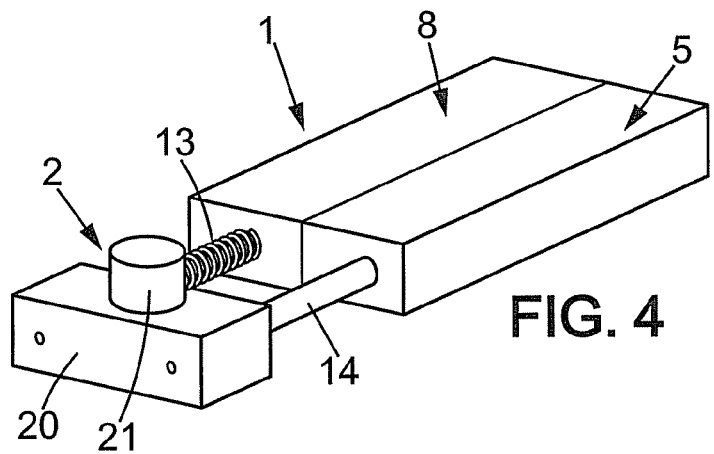
FIG. 4 is a simplified perspective view of a possible practical embodiment of a device as shown in FIGS. 1A and 1B.

FIG. 4 is a perspective view of a possible practical embodiment of the device 1 (like numerical references are used to designate the members that are the same as the members shown in FIGS. 1A and 1B) which is in the form of a preassembled assembly suitable for being mounted in a recess in the support part (part 3 in FIGS. 1A and 1B). It should be noted that the device 1 has a compact substantially rectangular shape. In the example shown in FIG. 4, the body 2 is constituted by a bridge 20 whose purpose is to unite the connection 14 with the second core 9 surrounded by the return spring 13, while the latch function is assigned to a stud or wheel 21 mounted on the bridge 20; it is the stud or wheel 21 that is suitable for engaging in a facing recess to form the latch.

Figure 2A:
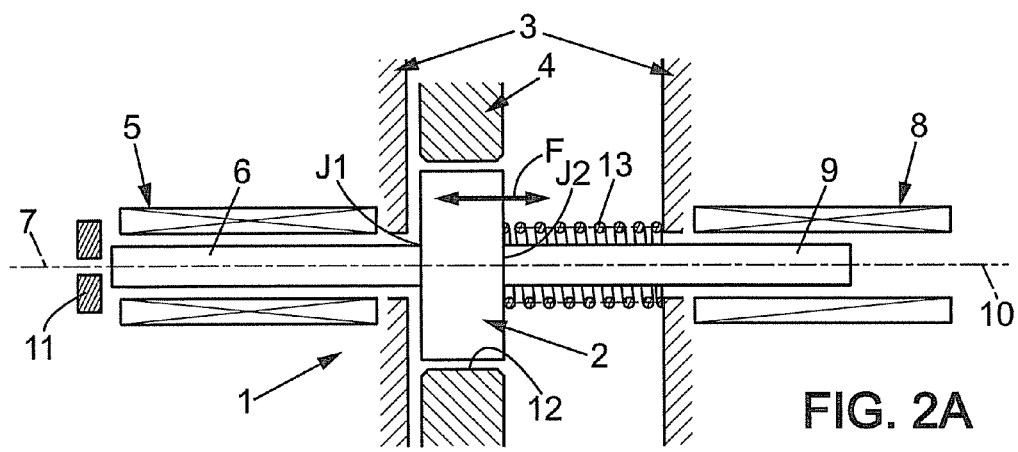
FIGS. 2A and 2B are diagrammatic views of a variant embodiment of the device of FIGS. 1A and 1B, shown in respective ones of two operating positions.
Figure 2B:
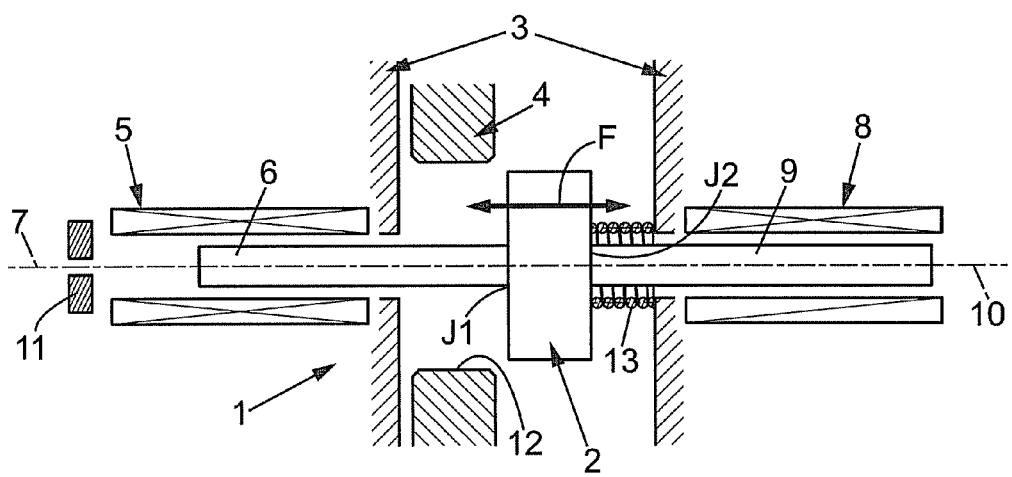

FIGS. 2A and 2B show a variant embodiment of the arrangement of FIGS. 1A and 1B that can be implemented providing the shapes and the relative positions of the parts 3 and 4 so permit. The various component members of the device 1 and their respective functions remain identical to those of the arrangement shown in FIGS. 1A and 1B (they are designated by like numerical references), except for their positioning. In this variant embodiment, the first and second electromagnets 5 and 8 are disposed parallel to each other on either side of the body 2, and, in particular so as to avoid generating torque that might interfere with the desired operation of the device, the two electromagnets 5 and 8 are disposed on either side of the body 2 such that their respective cores 6 and 9 extend substantially in alignment with each other; in other words, the two cores 6 and 9 are substantially in alignment. Otherwise, operation the device 1 remains identical to the device operation described above.

It should be noted that, in this variant embodiment, the mutually offset positioning of the two cores 6, 9 of the electromagnets is obtained by construction and both of the cores 6, 9 can be secured directly to the body 2 at the junctions J1, J2, as shown in FIGS. 2A and 2B, or else they can be secured thereto via respective connections (not shown).

As mentioned above, the parallel mounting of the two electromagnets is not essential insofar as space is available. FIGS. 3A and 3B show another embodiment of a device of the invention in which the two electromagnets 5 and 8 are disposed at any angles relative to each other and relative to the body 2. In FIGS. 3A and 3B, like numerical references are used to designate members and portions that are identical to those of FIGS. 1A, 1B, 2A, and 2B.

Since the body 2 can be moved along a path (arrow F) that extends in the same direction as in the preceding figures, the first electromagnet 5 is inclined relative to said path and the second electromagnet 8 is disposed transversely to said path (e.g. approximately perpendicularly thereto).

Firstly, as regards the first electromagnet 5, the above-mentioned connection 14, which is, in particular, in the form of a rod secured to its core 6, is connected to the body 2 via a link 15 that is hinged to pivot at both of its ends, respectively on the body 2 and on the rod 14.

Secondly, as regards the second electromagnet 8, its core 9 is connected to the body 2 via a crank linkage 16. This linkage 16 comprises a link 17 interposed, with pivot hinges, between the core 9 and the end of one arm of an L-shaped bell-crank 18 mounted to pivot at its vertex on the part 3. The end of the other arm of the bell-crank 18 is connected, with pivot hinges, to the body 1 via a second link 19.

Thirdly, as regards the return spring 13, it could be constituted by a helical compression spring interposed between the body 2 and a stationary part, as imagined above. By way of a variant, the return spring is, in this example, constituted in the form of a traction spring interposed between a stationary point on the part 3 and the hinged coupling between the link 17 and the corresponding arm of the bell-crank 18.

Operation of the device shown in FIGS. 3A and 3B remains identical to the manner of operation explained above.

Regardless of which embodiment is chosen, the first electromagnet 5 operates intermittently and briefly only, solely for releasing the locking effect procured by the permanent magnet 11. As a result, the first electromagnet 5 can be of small size, e.g. typically of a power of 4 watts (W) powered under regulated DC voltage of 5 volts (V). Since the second electromagnet 8 serves to hold the body 2 in the second position (unlocking position), it must therefore be switched on throughout the unlocking stage. It is then chosen to be of a more powerful type, e.g. typically 20 W powered under a pulsed voltage of 28 V, which makes it possible to reduce the amount of heating. Such choices for the two electromagnets 5, 8 make it possible to limit very significantly the amount of electrical power required for the device to operate.

What is claimed is:

1. A device suitable for moving a body along a substantially linear path between a first predetermined position and a second predetermined position, said device comprising:
   - a first electromagnet which has a first moving core physically secured, directly or indirectly, to said body at a first junction with the body and arranged to have a first axis of action on said body that is substantially parallel to said linear path, said first core being arranged to travel through a first stroke;
   - a second electromagnet which has a second moving core physically secured, directly or indirectly, to said body at a second junction with the body and arranged to have a second axis of action on said body that is substantially parallel to said linear path, said second core being arranged to travel through a second stroke, said first stroke and said second stroke being of a same length, said second junction being distinct from the first junction; and
   - a permanent magnet disposed to cooperate magnetically with said first core when the body is in the first predetermined position;

wherein the first electromagnet extends along the first axis of action and the second electromagnet extends along the second axis of action; and the first axis of action is distinct from the second axis of action.

2. A device according to claim 1, further comprising return means associated functionally with the body in a manner such that return means are inoperative when the body finds itself in its first position and are suitable for returning the body to its first position when said body is in its second position.

3. A device according to claim 2, wherein the return means comprise at least one spring in contact with the body.

4. A device according to claim 1, wherein the first and second electromagnets are arranged to operate in opposition so that the core of one of them is in an "out" position in which it stands proud while the core of the other of them is in the "in" position, and vice versa.

5. A device according to claim 1, wherein the first and second electromagnets are disposed on the same side of the body.

6. A device according to claim 1, wherein said first core and said second core travel simultaneously.

7. A device according to claim 1, wherein the two electromagnets are not excited when the body is in the first predetermined position.

\* \* \* \* \*